Patented Apr. 28, 1936

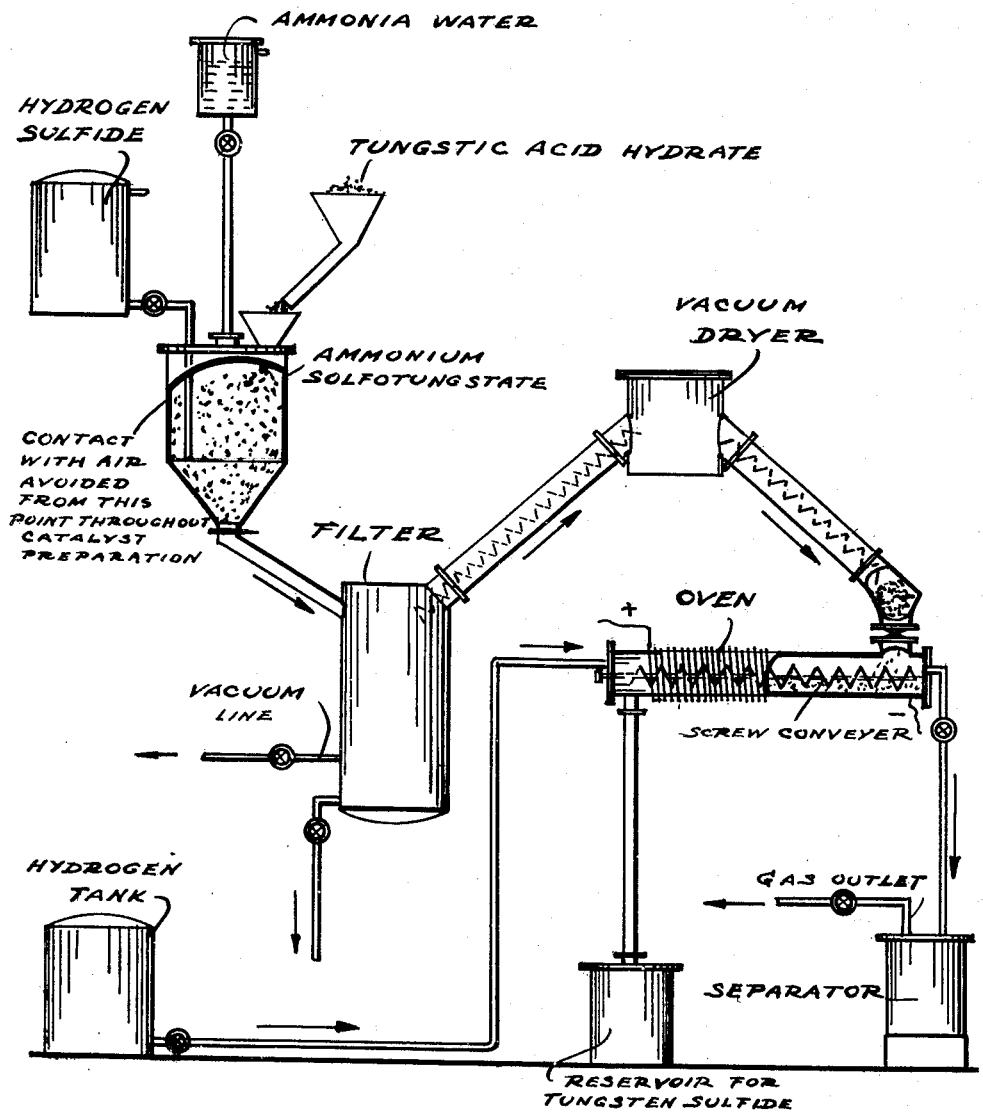

2,039,259

UNITED STATES PATENT OFFICE 2,039,259

CARRYING OUT CATALYTIC REACTIONS

Mathias Pier, Heidelberg, and Paul Jacob and Walter Simon, Ludwigshafen-on-the-Rhine, Germany, assignors to Standard-I. G. Company, Linden, N. J., a corporation of Delaware Original application January 15, 1932, Serial No. 586,948. Divided and this application May 29, 1934, Serial No. 728,132. In Germany January 30, 1931

4 Claims. (Cl. 196—53)

For carrying out catalytic reactions, in particular for the production of valuable hydrocarbons by destructive hydrogenation of most various kinds of hydrocarbon products, such as all varieties of coals, tars, mineral oils, or products obtained by conversion or distillation or extraction of any of them, which treatment, as is known is carried out at temperatures between 300° and 700° C. and under elevated pressures, preferably above 50 atmospheres, it has already been proposed to use metal sulphides as catalysts.

We have now found that metal sulphides other than iron sulphide are of a particularly high activity if they have been prepared prior to their use in the catalytic reaction from metals or compounds thereof, such as oxides, hydroxides, carbonates or other salts, under vigorously sulphidizing conditions, i. e. by treatment under strong conditions with liquid or vaporous sulphur or volatile sulphur compounds containing the sulphur in divalent state, or by the thermal decomposition of thio salts, and by substantially excluding substances having an oxidizing effect during and after this preparation. The said treatment with sulphur or volatile sulphur compounds is preferably effected at temperatures between 300° and 600° C. and in any case in the absence of oxygen or gases containing the same, such as air or steam. Also hydrogen should not be present in large amounts since large amounts of hydrogen considerably moderate the sulphidizing conditions; however, small amounts of hydrogen up to about 10 per cent with reference to the entire amount of volatile constituents may be added to the sulphidizing substances. As examples of the said sulphidizing compounds may be mentioned hydrogen sulphide, mercaptan, thiophenol, carbon disulphide and thioacetic acid. In case sulphides, as for example commercial sulphides, such as sulphides obtained by precipitation with hydrogen sulphide from solutions of metal salts, are employed as initial materials for the catalysts to be prepared according to the present invention the sulphidizing substances may be allowed to act on these materials under ordinary or elevated pressure. As initial sulphides to be improved by this treatment may be mentioned those of the metals from groups 2 to 8 of the periodic system with the exception of iron, as for example the sulphides of zinc, titanium, chromium, molybdenum, tungsten, vanadium, manganese, cobalt or nickel.

In case other compounds are used as initial materials, as for example metals or oxides of metals the sulphidizing treatment is effected, at least for some time, under elevated pressure. The specific pressure to be employed depends on the temperature, on the nature of the initial material to be treated and on the particular kind of sulphidizing substance used. Pressures of from 3 to 15 atmospheres or more are as a rule satisfactory.

Also from heavy metals and compounds thereof other than the sulphides, as for example the oxides, hydroxides, carbonates, nitrates, chlorides, nitrides or phosphides, the said valuable catalysts may be prepared by treatment thereof with sulphidizing agents, i e. liquid or volatilized sulphur or volatile divalent sulphur compounds, if desired together with small amounts of hydrogen or with other extraneous gases, such as nitrogen, carbon monoxide or carbon dioxide, at elevated temperatures, preferably above 300° C. and under elevated pressure. The heavy metals of the 4th to the 7th groups of the periodic system, as for example titanium, zirconium, vanadium, chromium, molybdenum, tungsten, manganese or rhenium, and also zinc, cadmium, cobalt and nickel or their compounds, may be used with particular advantage for the preparation of the said catalysts. Vanadium nitride may be mentioned as a very suitable substance for the preparation of catalysts. Those of the said elements, the oxides or hydroxides of which are capable of forming salts with ammonia or any other basic substances, may be employed in the form of such salts, as for example ammonium vanadate. All the substances hereinbefore mentioned may be employed either alone or in admixture with each other or with other additions such as copper, silver, aluminium, titanium and tin.

As sulphidizing agents may also be employed gas mixtures which under the conditions of operation yield sulphur or divalent sulphur compounds, as for example mixtures of sulphur dioxide and hydrogen.

The treatment of the said metals or metal compounds is preferably carried out by compressing volatile sulphur compounds, such as hydrogen sulphide, carbon disulphide and the like, either alone or in admixture with each other or with gases other than those comprising free oxygen or splitting off oxygen under the conditions of operation such as steam, and in the absence of hydrogen in amounts larger than 10 per cent, at room temperature or elevated temperature and allowing them to flow over or through the said metals or metal compounds at elevated temperature, as for example between 150° and 700° C., preferably between 300° and 600° C. Sulphur, especially in the vaporized form, may be used instead of volatile sulphur compounds. The sulphur which remains unused after the treatment may be removed by leading thereover hydrogen or other gases. Sometimes it is also preferable to carry out after this operation a treatment with volatile compounds of divalent sulphur, especially hydrogen sulphide. Sometimes it is advantageous to expose the metal and/or one or several of its compounds to the vapors or gases containing elementary or combined sulphur in as finely ground a state as possible. But the material to be treated may also be present in other forms, as for example in the form of plates, sticks, nets, cubes, rings or star-shaped bodies as may appear most suitable for the catalytic reaction. Sometimes it may be advantageous to employ the catalyst materials in the form of frothy structures which may be obtained by adding substances evolving gases during the preparation of the catalyst such as ammonium carbonate or ammonium nitrite. The material to be treated may be kept in motion, as for example by stirrers, spirals, paddles or shaking grates.

It has been found to be preferable to vary the temperature and/or the pressure during the treatment, which may be effected by increasing or decreasing the temperature and/or the pressure; for example the temperature may be slowly raised from 300° to 400° C. while the pressure is maintained at 10 atmospheres or slowly raised from 2 to 15 or 50 atmospheres. When working with hydrogen sulphide pressures between 2 and 15 atmospheres are suitable. But also pressures up to 100, 150, 200 and 1000 atmospheres may be employed when high pressure vessels are available for the treatment of the catalyst. Even a treatment at a pressure of 2 atmospheres leads to catalysts having a better activity than catalysts treated at ordinary pressure. If the treatment with sulphur or volatile sulphur compounds is carried out under pressures higher than from 5 to 10 atmospheres it requires a shorter reaction period than when a pressure of only 2 atmospheres is employed. The catalyst may also be treated with sulphur or volatile sulphur compounds first at rising temperatures without the employment of pressure and then further treated under increased or increasing pressure at the same or a raised temperature or rising temperatures. For example, the catalyst may be treated with hydrogen sulphide first by heating in the course of from 30 to 70 hours from 150° to 300° or up to 400° C. under atmospheric pressure and then heating at 400° or 500° C. under a pressure of 10 or 15 atmospheres or at pressures rising in the course of 10 to 30 hours from 2 up to 20 atmospheres; or the catalyst may be heated in the presence of hydrogen sulphide under atmospheric pressure up to 300 C. and then further up to 415° C. under pressures of between 5 and 10 atmospheres or rising from 1 to 10 or from 1 to 15 or more atmospheres. It may also be advantageous to pretreat the metals or their compounds with hydrogen at elevated temperatures as for example at 250° or 300° C. or 400° C. at atmospheric or elevated pressures as for example of 10, 50, 100 or 200 atmospheres.

The treatment of the metals or their compounds may be effected in the same reaction chamber in which the catalytic reaction itself is carried out later on. It is not necessary to bring the material to be treated into the shape desired for the catalytic reaction before the sulphurization, because the shape may be subsequently imparted to the metal sulphide produced, for example by a pressing treatment or any other mechanical means. The catalyst materials may be employed in a rigid arrangement as plates, rings, sieves, cylinders or as coarse or fine grained materials between wire netting, or they may be introduced into the reaction vessel in the form of lumps or small cubes which may lie irregularly or in a regular arrangement on sieves or similar supporting devices.

The catalysts so produced may have added to them other substances which may act catalytically themselves, or as carriers or simultaneously as catalysts and carriers and which do not split off free oxygen under the working conditions, in particular together with sulphides obtained in a manner different from that described above, for example those obtained by interaction, at elevated temperatures, but under ordinary pressure, of metals or metal oxides and sulphur or divalent sulphur compounds. Also other substances, if desired, before the sulphidizing treatment may be added, for example difficultly reducible metal oxides, such as zinc oxide, titanium oxide, and alumina, or chromium oxide, magnesia, magnesite, furthermore active carbon, active silica, active alumina, bentonite, Florida earth, pumice. If carriers are employed the catalytic material may be applied to them either before or after the sulphurizing treatment. The sulphides obtained according to the present invention may also be mixed with metals, preferably in a finely divided state, such as aluminium, magnesium, silicon, tungsten, molybdenum, and then mechanically pressed together, if desired. A catalyst prepared from about 80 parts of metal sulphide, as for example tungsten sulphide and about 20 per cent of metal powder, such as aluminium powder has proved to be of particular advantage.

The preparation of the catalysts to be employed may also be effected with great advantage by thermal decomposition of the thio salts of the metal sulphides with the entire exclusion of substances having an oxidizing action, especially oxygen or gases containing free oxygen, such as air or steam. The term thio salts is employed herein to mean the salts of oxygen acids of metallic elements the oxygen of which has been wholly replaced by sulphur. For the preparation of the catalysts, sulphides of the metals of the 2nd to the 8th groups of the periodic system, as for example of zinc, magnesium, molybdenum, tungsten, vanadium, manganese, cobalt, nickel, titanium and aluminium, and the like if desired with an admixture of boron sulphide or thio salts, as for example of metals of the 5th and 6th groups of the periodic system, such as tungsten, molybdenum, chromium or vanadium or the like, or of other heavy metals, such as copper, rhenium and the like may be employed.

The thio salts are obtained for example by leading hydrogen sulphide through, or adding suitable soluble sulphides or solutions thereof, and more particularly ammonium sulphide solution to, aqueous solutions of salts, as for example ammonium tungstate. The thio salts, as for example ammonium thio tungstate, are then converted into the corresponding sulphides at an elevated temperature usually ranging between about 200° and 500° C., as for example at about 300° C. in a current of hydrogen, nitrogen, ammonia or carbon dioxide. If oxy salts are also formed during the preparation of the ammonium thio tungstate, oxy sulphides are also obtained by the said decomposition with the said gases. These oxy sulphides may be converted into sulphide or polysulphide free from oxygen by subsequent treatment with sulphur or volatile sulphur compounds free from oxygen such as hydrogen sulphide, carbon disulphide or the like at elevated temperatures ranging between about 300° and 500° C., as for example 400° C. Also other salts in which oxygen of the oxygen acids has been partially replaced by sulphur but which still contain oxygen may be used as initial materials. The oxy sulphides obtained by the decomposition of these salts may likewise be transformed in a highly active catalyst by simultaneous or subsequent treatment with sulphur or volatile divalent sulphur compounds at the above defined temperatures. These methods may be carried out in a single operation by adding sulphur vapor or volatile sulphur compounds free from oxygen to the said gases before the decomposition of the thio salts. In order to prevent the formation of oxy sulphides from the start, the production of the thio salts is preferably carried out under such conditions that a hydrolysis is suppressed to a great extent. This is effected by employing a sufficiently high concentration of hydrogen sulphide or ammonium sulphide, which may, if necessary, be enhanced by the employment of an increased pressure, as for example, a pressure of 3 atmospheres of hydrogen sulphide. The temperature should also be maintained sufficiently low. The concentration of the hydrogen sulphide or of the soluble sulphide employed must increase correspondingly with an increase in the concentration of the salt in solution, which is to be converted into the thio compound. Thus when treating an aqueous solution of ammonium tungstate of 20 per cent strength, a concentration of about 15 per cent by weight of hydrogen sulphide should be maintained in the solution. The preparation of an ammonium thio tungstate as free as possible from oxy salts may be carried out for example by spraying a solution of ammonium tungstate in a state of fine dispersion by means of a nozzle into a container filled with hydrogen sulphide, if desired under pressure, the exhausted hydrogen sulphide being continually replenished. The ammonium thio tungstate solution formed is withdrawn from the bottom of the vessel and is led while excluding air into a crystallizing pan likewise maintained in an atmosphere of hydrogen sulphide. Ammonium thio tungstate may also be prepared by bringing ammonium tungstate solution into contact with a volatile sulphur compound, as for example hydrogen sulphide, preferably in counter current, in a column filled with fillers, as for example Raschig rings. The ammonium thio tungstate solution is led into a crystallizing dish as already described.

The catalysts prepared in the said manner may be employed in admixture with each other or with other catalysts, especially with sulphides obtained by other methods, which are prepared for example from the metals and sulphur or sulphur compounds or from metal oxides or solutions of metal salts by treatment with hydrogen sulphide at elevated temperatures under less vigorous sulphidizing conditions. Oxides not reducible to the metal with hydrogen at temperatures below 400° C. as for example zinc oxide, titanium oxide, magnesia, alumina and the like, may also be added as these often act as promoters or as carriers. As further examples of carriers may be mentioned active carbon, active silica, bentonite, Florida earth, bauxite, pumice stone, magnesite, chromium oxide and the like. It may be advantageous to apply the thio salts or the metal sulphides to the carriers or promotors and then to carry out the decomposition into sulphides or the treatment with volatile sulphur compounds, the said treatment being preferably effected in the reaction chamber itself.

The catalysts according to the present invention are eminently active in the production of valuable hydrocarbons by the destructive hydrogenation of coals, tars, mineral oils, their distillation, extraction and conversion products and residues with hydrogen or gases having a reducing action which contain combined hydrogen, especially in a flowing condition, at elevated temperatures, in particular those ranging between 300° and 700° C. and under pressure, preferably above 50 atmospheres, or also in the cracking of liquid carbonaceous materials. The result may be the splitting up of the initial materials with the addition of hydrogen or the conversion of aliphatic hydrocarbons into aromatic or the simple refining of the initial materials, as for example crude benzene. Other catalytic reactions, such as the purification of gases by treatment with hydrogen, the preparation of methanol or hydrocarbons from carbon monoxide and hydrogen, the purification, especially the desulphurization, of carbonaceous substances (tar oils, mineral oils, fractions thereof such as crude benzol and the like) with hydrogen, preferably under pressure, the preparation of hydrogen sulphide from its elements, the hydrogenation of unsaturated and aromatic hydrocarbons, the dehydrogenation of hydrocarbons, the preparation of hydrogen or polymerization products from the waste gases from destructive hydrogenations or cracking gases and the like, may also be carried out with the said catalysts.

The catalysts obtainable according to the present invention are of particular advantage for the treatment of materials containing sulphur and which are free from oxygen. With materials containing oxygen, such as those containing phenols, it is of advantage to continuously add to the hydrogenating gas sulphur or divalent sulphur compounds, as for example hydrogen sulphide or carbon disulphide. It is also of advantage to mix sulphur to the initial materials.

According to the present invention the reaction chambers, for example, in the destructive hydrogenation of coals, tars, mineral oils and the like, may be subjected to high throughputs of the materials to be treated per unit of time without the yields of valuable products being injuriously affected. Thus the yield of useful hydrocarbon products obtained with the catalysts in accordance with the present invention is often 5 to 10 times as high as when working under otherwise like conditions and with the same high throughput with a catalyst prepared from molybdic acid and magnesium oxide. The catalysts have the further advantage that, for example, the destructive hydrogenation may be carried out at lower temperatures, as for example from 50° to 70° C. or more lower, than when employing sulphides from the usual sources, and with the same throughputs whereby the formation of gaseous hydrocarbons is prevented to a large extent. The resulting middle oils and products of higher boiling point are rich in hydrogen and may be advantageously worked up into illuminating oils, Diesel oils or lubricating oils; they may also be subjected to a cracking process or returned to the reaction chamber and may readily be split into valuable products of lower boiling point by reason of their high content of hydrogen.

The resulting benzines may be improved, when necessary, as regards their knocking properties by converting a fraction thereof into aromatic substances, for example by destructive hydrogenation above 500° C. and adding it to the main fraction again. The said catalysts, by reason of their good hydrogenating action, may be employed with special advantage for converting initial materials poor in hydrogen which are unsuitable for the preparation of benzine by destructive hydrogenation or cracking into products rich in hydrogen, even at comparatively low temperatures, as for example from 300° to 350° C., if desired without appreciable splitting.

In the same way, hydrocarbons containing oxygen or sulphur may be freed by means of the said catalysts in the presence of hydrogen from oxygen and sulphur (which treatment is also called hydrofining) and, if desired, subjected to a cracking, if desired in the presence of hydrogen.

The preparation of illuminating oils and lubricating oils by destructive hydrogenation may also be carried out with the said catalysts with substantially greater throughputs than with the catalysts hitherto known.

The sulphides prepared according to the present invention are entirely free from oxygen. No oxygen can be found therein by analytical methods. It is believed that these catalysts are even free from small traces of oxygen which cannot be detected by the minutest methods of analysis. This assumption is supported by the fact that if these catalysts are exposed to the air at ordinary temperature their activity begins to slowly decrease after a course of several days and that if stored in the presence of air for several weeks their activity becomes equal to that of the catalysts obtainable according to the hitherto usual methods, for example by converting metal oxides, such as tungsten oxide, with hydrogen sulphide at ordinary pressure. In the thus stored catalysts oxygen cannot be detected by analytical methods, but it may be that very small traces of oxygen from the air have been combined with or occluded to the catalytic mass. However, we wish to be understood that we do not restrict ourselves to this theory.

We have found that the above mentioned decrease in the catalytic activity of the catalysts obtained according to the present invention does not occur if these catalysts are precluded also after the preparation from free oxygen or substances having a substantial oxidizing effect. By "substances having a substantial oxidizing effect" we understand also air under atmospheric temperature if it is allowed to be in contact with the catalysts for a long time, as for example several days or more.

With iron sulphide prepared according to the methods above specified no marked improvement has been found compared with the iron sulphide obtained according to the hitherto known methods. Therefore the use of iron sulphide is not claimed in the present application.

The drawing is a diagrammatic illustration in partial sectional elevation and indicates apparatus and flow of materials suitable for the preparation of catalysts for use in the present invention.

The following examples will further illustrate the nature of this invention but the invention is not restricted to these examples.

*Example 1*

Tungstic acid hydrate is converted into ammonium paratungstate by dissolution in aqueous ammonia of 4 per cent strength and crystallization. The said compound is dried and then slowly heated with dry pure hydrogen sulphide under a pressure of 5 atmospheres to a temperature of 410° C., and kept at this temperature for from 24 to 36 hours, air being carefully excluded in each stage of this treatment. After cooling and releasing the pressure, the tungsten disulphide formed is comminuted and pressed into pieces under a hydraulic pressure of 200 atmospheres. The catalyst thus prepared is rigidly arranged in a high-pressure chamber and heated in a current of hydrogen to 430° C. The vapors of a middle oil boiling between 200° and 325° C. obtained by the destructive hydrogenation of brown coal low temperature carbonization tar are then led together with hydrogen under a pressure of 200 atmospheres over the catalyst at the said temperature. By cooling the vapors leaving the chamber, a water-white product containing 75 per cent by weight of constituents boiling up to 180° C. is obtained which may be directly employed as a motor fuel. The remaining 25 per cent of the product obtained may be worked up into illuminating oil or used as a Diesel oil or returned to the chamber and converted into benzine.

While, in the said manner, a throughput of from 1 to 1.5 kilograms of the said middle oil may be employed per hour and per liter of the catalyst, a throughput of from 2 to 3 kilograms per hour per liter of catalyst may be maintained when employing gas oil, whereas with mineral coal tar middle oil a throughput of from 0.5 to 1 kilogram per hour per liter of catalyst is preferable. If the initial material employed contains small amounts of constituents boiling above 325° C., especially of products poor in hydrogen such as pyrenes, it is preferable to select a very low throughput, of the order of from 0.3 to 0.7 kilogram per hour per liter of catalyst.

*Example 2*

Ammonium vanadate is gradually heated in flowing hydrogen sulphide under a pressure of 10 atmospheres to a temperature of 410° C. and kept thereat for about 24 hours. After cooling the catalyst is pressed into pieces and arranged in a high pressure chamber. A product boiling between 200° and 275° C. obtained by the catalytic treatment with hydrogen under pressure of topped German petroleum in the liquid phase is led together with hydrogen under a pressure of 200 atmospheres over the said catalyst at a temperature of 530° C., 2 kilograms of the initial material are employed per hour and each liter of catalyst. A benzine is obtained which constitutes a non-knocking motor fuel by reason of its content of aromatic compounds.

*Example 3*

A high-pressure chamber is filled irregularly with tungstic acid hydrate which has been brought into pieces of suitable shape by pressing and moulding under a hydraulic pressure of about 150 atmospheres, the said tungstic acid hydrate then being slowly heated in the presence of hydrogen sulphide and under a pressure of 15 atmospheres up to a temperature of 410° C. and treated at this temperature with hydrogen sulphide for about 48 hours. When the treatment is completed, the high pressure system is filled with illuminating gas under a pressure of 100 atmospheres and the illuminating gas is pumped in a cycle. Crude benzol is added to the circulating gas and, the mixture of gas and liquid led through a vaporizer, in which practically all the constituents falling within the boiling range of motor benzol are vaporized. About 3 per cent of an oil is withdrawn continuously from the vaporizer which yields by distillation about 70 per cent of constituents which are returned to the crude benzol while the remaining 30 per cent (i. e. about 1 per cent calculated on the original benzol) of constituents of higher boiling point are used for other purposes. The vaporized crude benzol together with the circulating illuminating gas passes through a preheater and then into the high-pressure chamber which is at a temperature of 320° C. The throughput amounts to from 2 to 3 kilograms per hour per liter of catalyst with a partial pressure of hydrogen of from 30 to 40 atmospheres. The gases and vapors leaving the chamber deposit a product when cooled which may be employed as a motor fuel after simple washing with caustic soda. The unsaturated compounds contained in the illuminating gas are converted into saturated compounds by passage over the catalyst.

The organic sulphur compounds are converted into hydrocarbons and hydrogen sulphide. The carbon monoxide is chiefly converted according to the reaction $2CO + 2H_2 = CO_2 + CH_4$. The gas used up or washed out during the reaction is replaced by fresh illuminating gas which has previously been compressed to 100 atmospheres and passed through a tower charged with active carbon to remove iron carbonyl, and finally freed from constituents giving rise to coking, as for example strongly unsaturated compounds, oxygen, oxides of nitrogen and sulphur compounds.

Example 4

Crystallized ammonium tungstate is slowly heated in a current of hydrogen sulphide under a pressure of 10 atmospheres to a temperature of 410° C. and treated at the same temperature with hydrogen sulphide for 20 hours. Crude naphthalene (hot pressed naphthalene) together with hydrogen under a pressure of 200 atmospheres is led over the catalyst at 340° C. 1 kilogram of naphthalene is employed per hour and each liter of catalyst. The gases and vapors leaving the chamber deposit, when cooled, a product which consists of 80 per cent by weight of decahydronaphthalene and 20 per cent of tetrahydronaphthalene.

Example 5

Benzene is led together with hydrogen under a pressure of 200 atmospheres at a temperature of 320° C. over the catalyst prepared according to Example 1 or 4, the throughput being from 0.1 to 0.5 kilogram per hour per liter of catalyst. The gases and vapors leaving the chamber deposit on cooling, a product which consists of 98.5 per cent by weight of cyclohexane, 1 per cent of aliphatic hydrocarbons and 0.5 per cent of unchanged benzene.

Example 6

A fraction free from asphalt, boiling above 325° C. and having a specific gravity of 0.922 is obtained from an American crude oil by fractional distillation with steam in vacuo. The said fraction is led together with hydrogen under a pressure of 200 atmospheres at 390° C. over a catalyst arranged rigidly within a reaction vessel, the said catalyst, being prepared by treating tungsten with sulphur at 500° C. in a closed vessel in the absence of oxygen under a pressure of 2 atmospheres with subsequent reduction with hydrogen at about 400° C. at atmospheric pressure. It is preferable to select a throughput of 2 kilograms of the said oil fraction per hour per liter of catalyst. A lubricating oil having a favorable temperature-viscosity curve and a low coking residue is obtained in a continuous operation.

Example 7

Ammonium paramolybdate is heated gradually up to 410° C. with pure dry hydrogen sulphide under a pressure of 10 atmospheres and kept at this temperature for 50 hours. The catalyst thus prepared is shaped into pieces, arranged rigidly in a high-pressure chamber and heated to 430° C. in a current of hydrogen under a pressure of 200 atmospheres. At the same temperature, the vapors of an American gas oil boiling between 200° and 325° C. are led together with hydrogen over the catalyst under a pressure of 200 atmospheres, 1.5 kilograms of the gas oil being employed per hour and each liter of catalyst. By cooling the vapors behind the chamber a water-white product is obtained containing from 85 to 90 per cent by weight of constitutents boiling up at 180° C.; the remaining about 15 per cent may be employed as illuminating oil.

Example 8

Granulated tungsten is first treated for 24 hours under a pressure of 50 atmospheres at a temperature of 500° C. with hydrogen and then in a closed vessel under a pressure of 2 atmospheres at a temperature of 450° C. with sulphur in the absence of oxygen. This catalyst is rigidly arranged in a reaction vessel and a middle oil obtained by fractional distillation of a German crude oil is passed together with hydrogen over the catalyst under a pressure of 200 atmospheres and at a temperature of 450° C. A product 80 per cent of which distils up to 180° C. is obtained.

If, however, tungsten is pretreated with hydrogen in the manner described above and then, instead of being treated with sulphur, arranged rigidly, together with sulphur in the proportion of 2:1 in the reaction vessel and then the same middle oil is passed over it under the above described conditions, a product is obtained only 50 per cent of which distils up to 180° C.

Example 9

Tungstic acid in lump form is treated for 36 hours under a pressure of 10 atmospheres at a temperature of 440° C. with hydrogen sulphide. If a fraction obtained from a German crude oil and boiling between 200° and 325° C. be passed together with hydrogen under a pressure of 200 atmospheres over this catalyst, a product is obtained 70 per cent of which distils up to 180° C.

If, however, the tungstic acid is treated under atmospheric pressure with hydrogen sulphide while the conditions as regards temperature and duration are similar to those described above the same oil fraction yields a product only about 40 per cent of which distils up to 180° C.

Example 10

Hydrogen sulphide is led into a solution of 1 kilogram of tungstic acid hydrate in 12 liters of aqueous ammonia having a specific gravity of 0.950 until the solution is saturated. After allowing the whole to stand for a long period of time, well defined golden yellow crystals of ammonium thio tungstate separate out. When leading in the hydrogen sulphide care should be taken that no ammonium oxy thio tungstate separates out, which may be the case if the temperature of the solution is too low. It is preferable to work at about 30° C. The resulting ammonium thio tungstate, obtained free from ammonium oxy thio tungstate by careful working, is well dried in vacuo and decomposed at 300° C. in a current of dry hydrogen or carbon dioxide. In this manner a tungsten disulphide quite free from oxygen is obtained. The resulting sulphide is shaped into pieces by pressing, preferably under high pressure, and arranged rigidly in a high-pressure chamber. If a middle oil obtained by the destructive hydrogenation of a brown coal low temperature tar be led over the said catalyst at 425° C. together with hydrogen under a pressure of 200 atmospheres, a water-clear product is obtained which consists to the extent of 70 per cent of constituents boiling up to 180° C. This benzine contains from 40 to 45 per cent of constituents which pass over below 100° C. and is free from unsaturated hydrocarbons and phenols. The fraction above 180° C. may be very well employed as a Diesel oil or illuminating oil.

Instead of with pure tungsten disulphide prepared as above stated, good results are also obtained by employing mixtures with other sulphides, prepared as far as possible with the exclusion of oxygen, as for example zinc sulphide, magnesium sulphide, aluminium sulphide, vanadium sulphide, chromium sulphide, molybdenum sulphide, manganese sulphide, rhenium sulphide, cobalt sulphide, nickel sulphide and the like.

If the tungsten disulphide, or the mixture with the other sulphides, contains small amounts of compounds containing oxygen, as for example oxy sulphides, the activity of the catalyst is less than that of the sulphide catalysts free from oxygen.

Example 11

The tungsten disulphide prepared according to Example 1 is mixed with 20 per cent of Florida earth and made into paste at room temperature, dried and arranged rigidly in the form of pieces in a high-pressure chamber and heated slowly to 425° C. while causing hydrogen to flow thereover under a pressure of 200 atmospheres. A middle oil (boiling between 200° and 325° C.) obtained from crude petroleum by distillation, is led together with hydrogen at 200 atmospheres pressure over the catalyst. A product may be condensed behind the chamber of which half consists of water-clear benzine and half of a middle oil rich in hydrogen which constitutes a very good illuminating oil.

Example 12

Ammonium oxy sulpho tungstate is completely converted into tungsten disulphide by leading hydrogen sulphide thereover at about 400° C. This is shaped into pieces and arranged rigidly in a high-pressure chamber. If a middle oil obtained by the destructive hydrogenation of mineral coal low temperature tar be led together with hydrogen under a pressure of 250 atmospheres over the said catalyst at 430° C., a product is obtained consisting up to the extent of 50 per cent of constituents boiling up to 180° C. The remainder may be employed as a Diesel oil. In the same way for example tungsten sulphide prepared from a metal and sulphur and which still contains small amounts of oxysulphide may be converted into a highly active tungsten disulphide and employed in the said process without any reduction in yield.

Example 13

Tungstic acid hydrate is made into a thin pulp with ammonium sulphide or ammonium polysulphide, evaporated to dryness and treated with hydrogen sulphide at 350° C. The tungsten disulphide obtained is arranged in the form of pieces in a high-pressure chamber and American gas oil together with hydrogen under a pressure of 200 atmospheres is led thereover at 430° C. A water-clear product containing 65 per cent of constituents boiling up to 180° C. is obtained.

Example 14

Rhenium sulphide, obtained by way of the thio salt, is laden with benzine vapors to reduce its pyrophoric nature and then shaped and brought to the desired size by pressing with a hydraulic press. If a gas oil be led together with hydrogen under a pressure of 200 atmospheres over the said catalyst at 425° C., a reaction product is obtained containing 50 per cent of constituents boiling below 180° C. The remainder constitutes a middle oil extremely rich in hydrogen.

Example 15

The vapors of industrial crude benzol are passed over the catalyst described in Example 10 at a temperature of about 320° C. together with hydrogen under a pressure of about 40 atmospheres. Several volumes of vaporous crude benzol are passed hourly over each volume of catalyst. A product is obtained which in respect of the initial materials has an unchanged boiling point curve and in which the aromatic hydrocarbons contained in the initial materials are substantially completely unchanged. The product is free from compounds which become dark colored when treated with sulphuric acid, and from sulphur and from compounds which on evaporation lead to resinification.

The same result may be obtained at atmospheric pressure by passing through hourly only 1 volume of crude benzol vapor per volume of catalyst.

Example 16

Hydrogen sulphide is passed into a 20 per cent solution of molybdic acid in ammonia water of 15 per cent strength until the latter is saturated therewith. In this manner a precipitate of ammonium thio molybdate in the form of red violet crystal needles is obtained in good yields, which thereupon is separated, washed with alcohol and ether and dried in vacuo. The ammonium thio molybdate thus prepared is then decomposed at 400° C. in a stream of dry hydrogen with the formation of molybdenum disulphide.

This catalyst is rigidly arranged in the form of pieces in a high pressure vessel, and then, in a stream of hydrogen slowly heated up to 450° C. at a pressure of 200 atmospheres. A middle oil obtained by destructive hydrogenation of German mineral oils is then passed together with hydrogen at the same temperature over the said catalyst. A water clear product of which 60 per cent boils up to 180° C. is thus obtained. The remaining 40 per cent of the said product may again be passed over the catalyst or they may be used as illuminating or Diesel oil.

*Example 17*

The vapors of benzine obtained by low temperature carbonization of brown coal and which can be employed as motor fuel only by chemical refining accompanied by considerable losses, are passed together with hydrogen under a pressure of 50 atmospheres and at a temperature of 425° C. over tungsten disulphide prepared as described in Example 10. A benzine is obtained in an almost quantitative yield which is practically free from sulphur compounds and hydrocarbons not completely saturated with hydrogen and which may satisfactorily be used as motor fuel. The advantage of this treatment with the new catalyst over that with the catalysts hitherto in use consists in the fact that it is possible to work, while maintaining a relatively high velocity of flow, at moderately elevated pressures, at which the benzine, by reason of the dehydration of the naphthenes present, obtains considerably better knocking properties than when working at higher pressures.

In an analogous manner benzine obtained by low temperature carbonization of mineral coal, crude benzol, or benzines obtained by cracking tars, mineral oils or shale may be employed instead of the brown coal low temperature carbonization benzine.

*Example 18*

The vapors of a middle oil obtained by distillation of mineral oil are passed together with hydrogen at a temperature of 450° C. and under a pressure of 200 atmospheres but while maintaining a low partial pressure of these vapors, namely of less than 10 atmospheres, as for example of 6 atmospheres over a catalyst prepared in the manner described in Example 10. 50 per cent of the resulting reaction product boils up to 100° C., further 40 per cent between 100° and 160° C. An equal amount of middle oil is passed together with hydrogen at 525° C. under the same total pressure but under a high partial pressure of the middle oil, namely of more than 10 atmospheres, for example of 35 atmospheres, over a catalyst consisting of molybdic acid and zinc oxide. A product is thus obtained of which from 5 to 10 per cent boils up to 100° C., further 45 per cent between 100° and 150° C., and the remainder up to 180° C. The products obtained by these different treatments when mixed together yield a motor fuel having the boiling point curve of a benzine usual in commerce and which may be satisfactorily used as a motor fuel.

*Example 19*

Sodium thio chromite obtained by melting potassium chromate with a mixture of sulphur and the carbonates of sodium and potassium is converted into the thio chromic acid by means of dilute hydrochloric acid while excluding air. This thio chromic acid is converted into chromium sulphide by passing thereover at 300° C. hydrogen to which hydrogen sulphide has been added.

The vapors of meta cresol are passed together with hydrogen at a temperature of 420° C. and under a pressure of 250 atmospheres over the catalyst thus prepared. The meta cresol is almost quantitatively converted into hydrocarbons mainly consisting of methyl cyclohexane. Hydrogen sulphide is added to the mixture of hydrogen and the vapors of meta cresol in such an amount that it is present in a concentration of about 0.8 per cent.

*Example 20*

A concentrated solution of sodium vanadate is added to a large excess of a concentrated solution of ammonium hydrosulphide obtained by saturating a 33 per cent ammonia solution with hydrogen sulphide. After allowing the mixed solutions to stand for several hours well shaped crystals of ammonium thio vanadate are formed which are quickly sucked off, washed with alcohol and ether and dried in vacuo. The sulpho salt thus prepared is decomposed at 350° C. to vanadium sulphide in a stream of dry hydrogen to which dry hydrogen sulphide has been added.

The vapors of an unrefined crude benzol as is obtained in the carbonization of mineral coal is passed together with hydrogen at 375° C. and under a pressure of 100 atmospheres over the catalyst thus prepared. From the gases and vapors leaving the reaction space a product is separated by condensation which represents a benzol excellently suitable for use as motor fuel. This product is free from compounds reacting with sulphuric acid with the formation of colored substances as well as from substances causing resinification by vaporization. It is also practically free from sulphur. If the said treatment is carried out under otherwise the same conditions with a vanadium sulphide obtained by one of the hitherto usual methods, as for example by precipitation of dissolved salts of vanadium with hydrogen sulphide, the degree of purification is much lower.

*Example 21*

By subjecting American crude oil containing 2 per cent of resins and 4 per cent of asphalt to fractionate distillation with steam in vacuo a fraction boiling above 325° C., having a specific gravity of 0.922 and which is free from asphalt is obtained. This fraction is passed in the liquid state together with hydrogen at 400° C. and under a pressure of 200 atmospheres over a catalyst consisting of cobalt sulphide prepared in the manner described below and which is rigidly arranged in the reaction vessel. A lubricating oil having a satisfactory temperature viscosity curve and a low coke test is thus obtained.

The cobalt sulphide employed is obtained by precipitation by means of hydrogen sulphide from an aqueous solution of a cobalt salt, filtering off the precipitate formed and subsequently treating it with hydrogen sulphide at 350° C.

Similar results are obtained by employing for the above treatment one or more of the sulphides of vanadium, molybdenum, chromium or nickel treated with hydrogen sulphide or a carbonaceous sulphur compound for several hours and while excluding air at a temperature between 350° and 400° C.

This application has been divided out from our copending application Ser. No. 586,948, filed January 15th, 1932, which relates to improvements in carrying out catalytic reactions, in particular the destructive hydrogenation of hydrocarbon products and in which are claimed catalysts, and processes for carrying out catalytic reactions at elevated temperatures with combustible carbonaceous materials in the presence of catalysts, which comprise sulphides of heavy metals, other than iron, which during and after their preparation are precluded from substances having a substantial oxidizing action and which are prepared by treating heavy metals or their compounds with sulphidizing agents at temperatures between 150° and 700° C., added free hydrogen being present, if at all, in amounts not exceeding 10 per cent of the entire amount of volatile constituents, and the treatment, at least for some time being carried out under elevated pressure when the metal compound employed is one other than the sulphide, whereby all of the metal is completely combined with sulphur.

What we claim is:—

1. In carrying out catalytic reactions at elevated temperatures with combustible carbonaceous materials the step which comprises employing as a catalyst a sulphide of a heavy metal, other than iron, capable of forming a thio salt, which sulphide during and after its preparation is precluded from substances having a substantial oxidizing action and which is prepared by decomposition of a thio salt of said heavy metal at an elevated temperature, said thio salt being of the form of a salt of an oxygen acid of a metallic element, the oxygen of which has been wholly replaced by sulphur, the heavy metal present in the sulphide thus being completely combined with sulphur.

2. In the destructive hydrogenation of hydrocarbon products at a temperature between 300° and 700° C., under superatmospheric pressure and in the presence of a catalyst the step which comprises employing as a catalyst a sulphide of a heavy metal, other than iron, capable of forming a thio salt, which sulphide during and after its preparation is precluded from substances having a substantial oxidizing action and which is prepared by decomposition of a thio salt of said heavy metal at an elevated temperature, said thio salt being of the form of a salt of an oxygen acid of a metallic element, the oxygen of which has been wholly replaced by sulfur, the heavy metal present in the sulphide thus being completely combined with sulphur.

3. In the destructive hydrogenation of hydrocarbon products at a temperature between 300° and 700° C., under superatmospheric pressure and in the presence of a catalyst the step which comprises employing as a catalyst a sulphide of a heavy metal from groups 5 and 6 of the periodic system capable of forming a thio salt, which sulphide during and after its preparation is precluded from substances having a substantial oxidizing action and which is prepared by decomposition of a thio salt of said heavy metal at an elevated temperature, said thio salt being of the form of a salt of an oxygen acid of a metallic element, the oxygen of which has been wholly replaced by sulfur, the heavy metal present in the sulphide thus being completely combined with sulphur.

4. In the process as claimed in claim 1 using as catalyst a sulphide which is admixed with another catalytic substance not splitting off oxygen under the conditions of the preparation of the said sulphide.

MATHIAS PIER.
PAUL JACOB.
WALTER SIMON.